(12) United States Patent
Flacher et al.

(10) Patent No.: US 12,051,023 B2
(45) Date of Patent: Jul. 30, 2024

(54) BENCHMARKING OF USER EXPERIENCE QUALITY

(71) Applicant: Content Square SAS, Paris (FR)

(72) Inventors: Corentin Flacher, Paris (FR); Vincent Colombet, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 16/937,950

(22) Filed: Jul. 24, 2020

(65) Prior Publication Data

US 2022/0027827 A1 Jan. 27, 2022

(51) Int. Cl.
| | |
|---|---|
| *G06Q 10/06* | (2023.01) |
| *G06F 11/30* | (2006.01) |
| *G06F 11/34* | (2006.01) |
| *G06F 16/2457* | (2019.01) |
| *G06F 16/9535* | (2019.01) |
| *G06F 16/958* | (2019.01) |
| *G06Q 10/0639* | (2023.01) |
| *G06Q 10/10* | (2023.01) |
| *G06Q 30/0201* | (2023.01) |
| *G06N 20/00* | (2019.01) |

(52) U.S. Cl.
CPC ... *G06Q 10/06393* (2013.01); *G06F 11/3006* (2013.01); *G06F 11/3428* (2013.01); *G06F 16/24578* (2019.01); *G06F 16/9535* (2019.01); *G06F 16/958* (2019.01); *G06Q 10/10* (2013.01); *G06Q 30/0201* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0089616 A1* | 4/2012 | Sa'adon | G06F 16/9535 707/754 |
| 2013/0138503 A1* | 5/2013 | Brown | G06Q 30/0203 705/14.45 |
| 2017/0359235 A1* | 12/2017 | Dalvi | H04L 67/535 |
| 2018/0239763 A1* | 8/2018 | Majumdar | G06N 20/20 |
| 2019/0073365 A1* | 3/2019 | Jamshidi | G06F 16/9535 |

\* cited by examiner

*Primary Examiner* — Arif Ullah
(74) *Attorney, Agent, or Firm* — Schwegman Lundberg & Woessner, P.A.

(57) ABSTRACT

A system and method for benchmarking user experience quality on websites across an industry. The method includes computing first site metrics for a first website, wherein a site metric is a quantitative description of user activity on a web site; computing a first industry satisfaction score for the first website, wherein the industry satisfaction score quantifies an overall level of satisfaction of users interacting with the first website, wherein the industry satisfaction score is computed based on satisfaction score pillar values and the computed site metrics, identifying usage metrics within the collected usage; comparing the first industry satisfaction score computed for the first website to a second industry satisfaction score previously computed for a second website, wherein the first website and the second website are from the same industry; and reporting the comparison results.

17 Claims, 9 Drawing Sheets

BENCHMARKING OF USER EXPERIENCE QUALITY

TECHNICAL FIELD

The present disclosure relates generally to analyzing website usage data and, more specifically, to techniques for benchmarking of user experience quality when interacting with websites in the same market.

BACKGROUND

As the use of online engagement tools continues to expand with the evolution of web and computing technologies, businesses, and other parties, may be interested in understanding how site visitors engage with web content. Specifically, webpage owners, operators, and administrators may seek to understand users' interactions with webpage features, how such interactions contribute to visitor happiness, engagement, loyalty, and the like, and whether improvements need to be added to a webpage to remain competitive. As webpage operators, such as online retailers, may compete with other page operators, just as neighboring brick-and-mortar retailers might compete for business, developing a clear understanding of the strengths and weaknesses of a website may allow owners, operators, and administrators to continuously improve web performance in order to reach respective targets and goals.

Certain qualitative standards for ascertaining site visitor happiness, engagement, and the like, include the Net Promotor Score® (NPS), and the American Customer Satisfaction Index® (ACSI). In addition, academic qualitative standards include WebQual™ and the Software Usability Measurement Inventory® (SUMI) index. While such standards provide qualitative information regarding site usage, the NPS® and ASCI® techniques fail to provide qualitative analyses based on reliable data captured on client websites.

In the related art, there are tools for quantitative analysis of site usage data. Such tools are designed to score a negative sentiment of a user engaging with the website. For example, if a user waits for an image to download, such a score is low. The negative scoring is for a specific website. Thus, such tools cannot benchmark performances across multiple websites.

Further, such tools fail to recommend which elements of the webpage should be improved to positively enhance the user experience in interacting with the websites.

Furthermore, conventional tools and techniques, while applicable to the execution of various qualitative and quantitative analyses, fail to provide broad qualitative and quantitative support, a feature which may enable website owners, operators, administrators, and the like to make effective, efficient decisions regarding webpage revision and user experience (UX) enhancement.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for benchmarking user experience quality on websites across an industry. The method comprises computing first site metrics for a first website, wherein a site metric is a quantitative description of user activity on a web site; computing a first industry satisfaction score for the first website, wherein the industry satisfaction score quantifies an overall level of satisfaction of users interacting with the first website, wherein the industry satisfaction score is computed based on satisfaction score pillar values and the computed site metrics, identifying usage metrics within the collected usage; comparing the first industry satisfaction score computed for the first website to a second industry satisfaction score previously computed for a second website, wherein the first website and the second website are from the same industry; and reporting the comparison results.

Certain embodiments disclosed herein also include a non-transitory computer readable medium having stored thereon instructions for causing a processing circuitry to execute a process, the process comprising: computing first site metrics for a first website, wherein a site metric is a quantitative description of user activity on a web site; computing a first industry satisfaction score for the first website, wherein the industry satisfaction score quantifies an overall level of satisfaction of users interacting with the first website, wherein the industry satisfaction score is computed based on satisfaction score pillar values and the computed site metrics, identifying usage metrics within the collected usage; comparing the first industry satisfaction score computed for the first website to a second industry satisfaction score previously computed for a second website, wherein the first website and the second website are from the same industry; and reporting the comparison results.

In addition, certain embodiments disclosed herein include a system for benchmarking user experience quality on websites across an industry. The system comprises a processing circuitry; and a memory, the memory containing instructions that, when executed by the processing circuitry, configure the system to: compute first site metrics for a first website, wherein a site metric is a quantitative description of user activity on a web site; compute a first industry satisfaction score for the first website, wherein the industry satisfaction score quantifies an overall level of satisfaction of users interacting with the first website, wherein the industry satisfaction score is computed based on satisfaction score pillar values and the computed site metrics, identifying usage metrics within the collected usage; compare the first industry satisfaction score computed for the first website to a second industry satisfaction score previously computed for a second website, wherein the first website and the second website are from the same industry; and report the comparison results.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
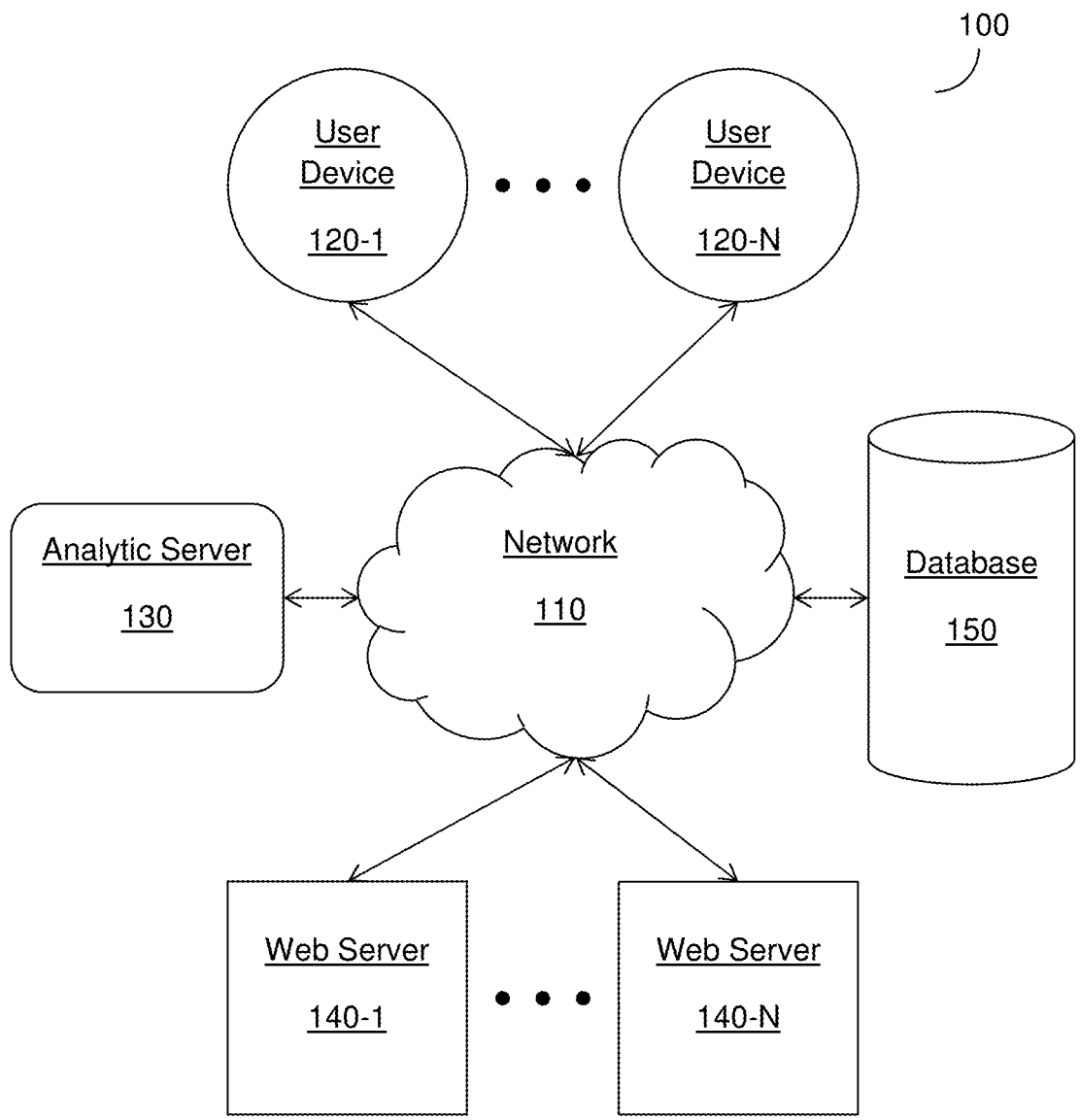
FIG. 1 is a network diagram depicting a network system disclosing the embodiments for comparison of user experience quality and analytics for websites in the same market.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram depicting a network system 100 disclosing the embodiments for comparison of user experience quality and analytics for websites in the same market. The system 100 includes one or more user devices, 120-1 through 120-N (hereinafter, "user device" 120 or "user devices" 120), an analytic server 130, one or more web servers, 140-1 through 140-N (hereinafter "web server" 140 or "web servers" 140), and a database 150. Further, in the system 100, the various components listed are interconnected via a network 110.

The network 110 provides interconnectivity between the various components of the system. The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be a full-physical network, including exclusively physical hardware, a fully-virtual network, including only simulated or otherwise-virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect with the various components of the system 100 via any combination of wired and wireless means.

The user devices 120 may be devices allowing a user to interact with the system 100 for purposes including, as examples and without limitation, providing webpage targets to the system 100 for analysis, receiving returns or outputs from the system 100, configuring system 100 parameters, other, like, purposes, and any combination thereof. Further, a user device 120 may be configured to receive returns or outputs from the web servers 140 to view webpages or other content developed by any of the web servers 140. A user device 120 typically includes a web browser (now shown) or any application (virtual, web, mobile, and the like) which allows a user to view, download, interact with, and engage with content provided by the web servers 140, the analytic server 130, or both. Examples of user devices 120 may be smartphones, personal computers, business systems, dedicated kiosks, tablet computers, and other, like, devices.

In an embodiment, a user device 120 may be operated by an administrator of one or more websites hosted by the web server or servers 140. Through the user device 120, reports generated by the analytic server 130 may be viewed. The user device 120 may be further configured to allow for configuration of one or more components of the system 100, issuing or executing instructions, or manipulating data.

Users of the user devices 120 may access at least one website hosted by the servers 140. The website may be, for example, an online retail platform, an e-commerce platform, and the like. In some embodiments, the user devices 120 can access an application installed on and executed by the servers 140. Such an application may include a mobile application (app), a cloud application, a web application, and the like. The various embodiments will be discussed herein with a reference to website(s), but they are equivalently applicable to application(s).

The analytic server 130, depicted in detail with respect to FIG. 7, below, is a system configured to perform the various methods described hereinbelow. The analytic server 130 may be implemented as physical hardware, as software virtualizing physical hardware, or as a combination of physical and virtualized components. An example block diagram of the analytic server 130 is provided below.

According to the disclosed embodiments, the analytic server 130 is configured to compare user experience quality and analytics for websites in the same market, thereby benchmarking the user experience quality. User experience quality refers to the in-page interactions between a site visitor and a webpage, including the user's actions, saved data, completed transactions, and the like. User data may further include data not describing in-page interactions (pageviews), but relevant to the user including, without limitation, links to pages referring the user to the website, the user's web browser, operating system, IP address, other, like, data, and any combination thereof. Analytics refers to the results or outputs of various analytic processes applied to collected user data, such as, as examples and without limitation, an average site visit time for all users, the number of users connecting to the site in a given period, other, like, analytics, and any combination thereof.

The web servers 140 may be one or more web sources of data other than the inputs received from the user devices 120. The web servers 140 may include data relating to websites, data relating to webpages, other, like, data, and any combination thereof. Data from the web servers 140 may be stored in the database 150 and may be processed by the analytic server 130. Web servers 140 may be local web sources, remote web sources, or any combination thereof. Examples of web servers 140 include, without limitation, repositories of webpage information, "live" webpages, other, like, sources, and any combination thereof. Web servers 140 may be connected with the network 110 via the means described hereinabove. As noted above, web servers can host websites and applications.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including only virtualized components, or as a hybrid physical-virtual system. Examples of devices which may be configured as a database 150 in the system 100 include, without limitation, local database hardware, cloud storage systems, remote storage servers, other, like, devices, and any combination thereof.

According to an embodiment, the database 150 may be configured to store or otherwise archive data relating to various measured KPIs, scores or other analytic data gathered, processed, or analyzed according to the disclosed embodiments. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
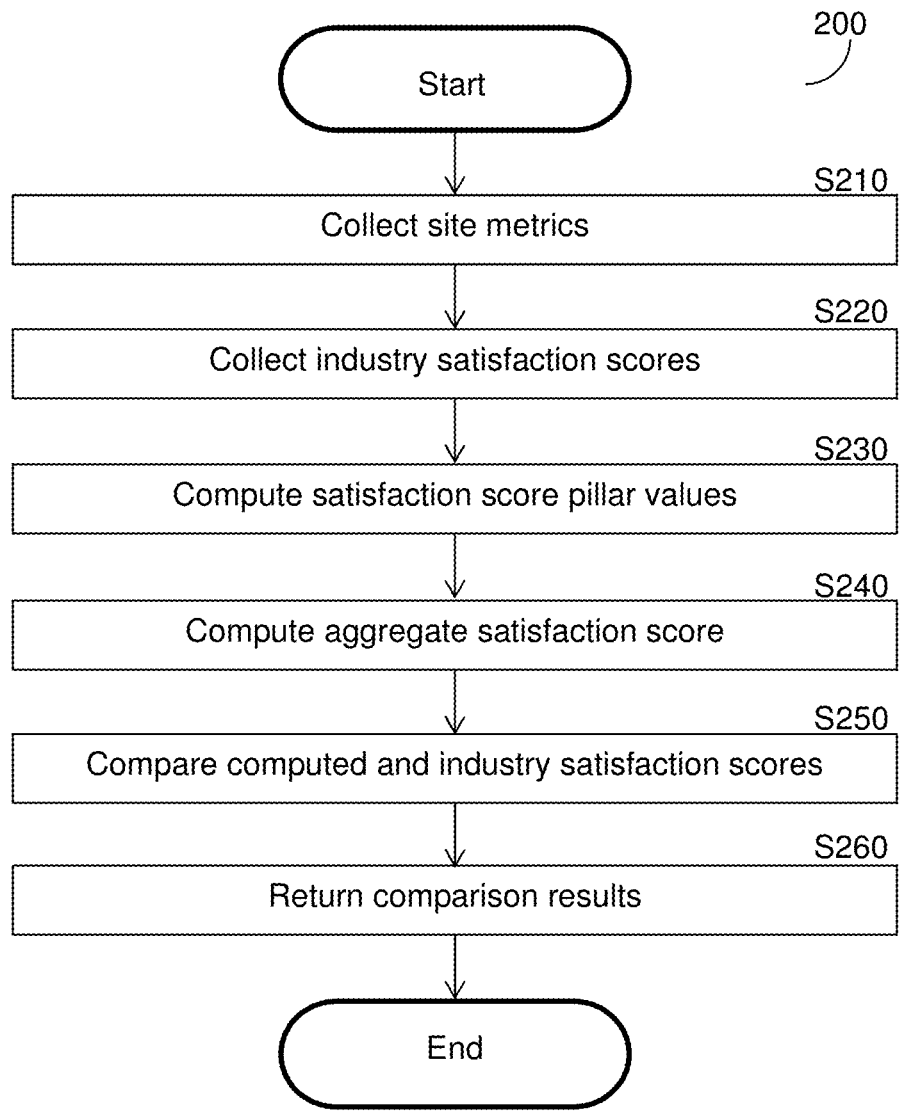
FIG. 2 is a flowchart depicting a method for benchmarking user experience quality, according to an embodiment.

FIG. 2 is an example flowchart 200 depicting a method for benchmarking user experience quality, according to an embodiment. In general, benchmarking user experience includes comparing user experience quality and analytics for websites across the same market.

At S210, site metrics are computed or otherwise collected. Site metrics are aggregate quantitative descriptions of website user activity. Site metrics are collected after or during a site metric computation process, such as the process described with respect to FIG. 3, below. Site metrics may be collected from one or more sources including, without limitation, analytic systems, such as the analytic server, 130, of FIG. 1, above, data stores, such as the database, 150, of FIG. 1, above, from other, like, sources, and any combination thereof.

At S220, previous industry satisfaction scores are collected. An industry satisfaction score is computed per website and quantifies the overall level of user satisfaction (e.g., happiness, engagement, and the like) of users interacting with the website or websites. The computation of an industry satisfaction scores may be achieved as discussed hereinbelow, according to methods similar or identical to those described with respect to S210. Computed industry satisfaction scores may be stored and, thus, retrieved from one or more data stores or warehouses including, without limitation, the database, 150, of FIG. 1, above. The industry satisfaction scores may be sorted, filtered, or categorized according to factors including, without limitation, site industry, site sub-industry, site address, other, like, factors, and any combination thereof.

According to an embodiment, the industry satisfaction scores, and the various component site metrics, and other, like, data, may be subsequently analyzed, evaluated, or otherwise applied to determine site key performance indices (KPIs) and satisfaction scores, and to perform various comparisons. As an example, industry satisfaction scores may include the respective satisfaction scores of the top five online fashion retail sites, as evaluated by traffic volume.

It may be understood that S220 may occur at any point prior to S230, including simultaneously with step S210, without loss of generality or departure from the scope of the disclosure.

At S230, satisfaction score pillar values are computed. Satisfaction score pillar values are factors describing pillars of a satisfaction score. A satisfaction score is a score describing an overall level of site satisfaction happiness, engagement, and the like, computed, as at S240 below, based on the values of one or more "pillars." The various pillars used in the computation of aggregate satisfaction scores at S240, below, reflect various aspects of user experience and satisfaction, as quantified through the pillars' respective values. Pillars are pre-defined, and may be assigned or weighted based on one or more factors including, without limitation, website type, such as "retail," "social media," and the like, preferences of an administrator, operator, owner, or the like, based on other, like, factors, and any combination thereof.

In an embodiment, a satisfaction score may be computed based on pillars describing the website's user experience as "flawless," "engaged," "sticky," "intuitive," and "empowered." Further, each component pillar of a website's satisfaction score may include various site metrics, such as those collected at S210, above, relevant to the respective pillars' characteristics. As an example, and without limitation, an "engaged" pillar may include site metric key performance indices (KPIs) describing the number of content pages visited, the session duration for non-buyers, bounce rates on content pages, bounce rates on a home page, interactions per unique views, and scroll quality scores.

Satisfaction score pillar values are computed relative to other websites competing or existing in the same industry. For example, a first website may include a satisfaction score pillar describing the website's engagement. In the same example, the values corresponding to the engagement satisfaction score pillar are calculated based on a usage metric score for the website's engagement, as compared to the same usage metric score for other websites in the same industry. Usage metric scores for the various components of each satisfaction score pillar may be determined based on analysis of site metrics collected at S210. In the same example, a site usage metric included in an engagement pillar may be a "bounce rate," describing the percentage of users who connect with a website and subsequently disconnect, rather than engaging further with the website. The "bounce rate," and other site metrics for a given site, may be determined based on the site metrics collected at S210.

Computation of satisfaction score pillar values at S230 may further include a benchmarking comparison of site metric KPIs, as collected at S210, with corresponding site metric KPIs for other sites in the same industry. The value of each pillar may be computed based on the metric score of each pillar's respective site metrics. The metric score of each site metric within a satisfaction score pillar may be determined by normalizing the given site's relevant site metric KPIs relative to a distribution of corresponding site metric KPIs for other sites in the same industry, as described with respect to FIGS. 4A and 4B, below. The distribution of corresponding site metric KPIs for other sites in the same industry may include site metric KPIs collected, accessed, or evaluated during the computation of industry satisfaction scores, as at S220, above.

Based on the determined normalized site metric, benchmarking scores for each satisfaction score pillar, each pillar's KPI may be computed as the sum of the benchmarking scores of each site metric included in the pillar. A pillar KPI may be computed by summing the benchmarking score of each included site metric, where the benchmarking score of each included site metric is a score out of a possible "N" points, where "N" is equal to one hundred divided by the number of included site metrics. As an example, where a pillar includes five site metrics, the benchmarking score of each site metric is calculated out of a possible twenty points.

In the same example, each of the five benchmarking scores may be added to yield a pillar score, where the pillar is scored out of one hundred possible points.

At S240, site satisfaction scores are computed. Site satisfaction scores describe the overall user experience or satisfaction of a website based on the factors determined hereinabove. Site satisfaction scores may be computed based on the pillar values computed at S230, above, and site metrics. Site satisfaction scores may be computed as the average of a site's pillars' values. As an example, a site satisfaction score may be determined to be fifty-two out of one hundred where the site's "flawlessness" pillar value is sixty-two, where the site's "stickiness" value is forty-four, where the site's "empowered" value is forty-five, where the site's "engaged" value is sixty-seven, and where the site's "intuitive" value is forty-four. In an embodiment, site satisfaction scores may be weighted, with various weightings assigned to each pillar's value, as determined by an operator, administrator, or the like, and a site satisfaction score may be computed as the weighted average thereof. Further, at S240, site satisfaction scores may be archived or otherwise saved to a data store or data warehouse, such as the database, 150, of FIG. 1, above, for subsequent analysis, including analysis in the determination of industry satisfaction scores for subsequent applications of the methods described herein, with respect to other sites.

At S250, computed industry satisfaction scores are compared. Computed satisfaction scores and the industry satisfaction scores may be compared to identify site performance issues and site satisfaction score pillars in need of improvement. S250 may include comparison of site satisfaction scores with industry satisfaction scores, comparison of site pillar values with industry pillar KPIs, other, like, comparisons, and any combination thereof. Further, comparison results may be returned for review and analysis at S260.

At S260, comparison results are returned. Comparison results present the output of comparison processes, such as those employed in comparison at S250, in formats applicable for manual user review, data aggregation, and other, like, practices. Comparison results may be returned in formats including, without limitation, graphical displays, charts, tables, machine-interpretable datasets, such as comma-separated value (CSV) formats, in other, like, formats, and any combination thereof. The comparison results at S260 may be included in a report, such as returned graphical displays, and one or more comparison results may be included in a satisfaction score report, such as is described with respect to FIG. 5, below, where such a satisfaction score report may be returned to a user through a user device, such as the user device, 120, of FIG. 1, above. In addition, where returning comparison results at S260 includes returning charts, one or more reporting charts describing satisfaction score and pillar value evolution, such as those described with respect to FIGS. 6A and 6B, below, may be returned to a user through a user device, such as the user device, 120, of FIG. 1, above. In an embodiment, comparison results, satisfaction score reports, and the like may be returned or reported according to one or more user-defined or predefined schedules including, without limitation, yearly reporting, semi-annual reporting, quarterly reporting, monthly reporting, weekly reporting, and the like, as well as any combination thereof.

Figure 3:
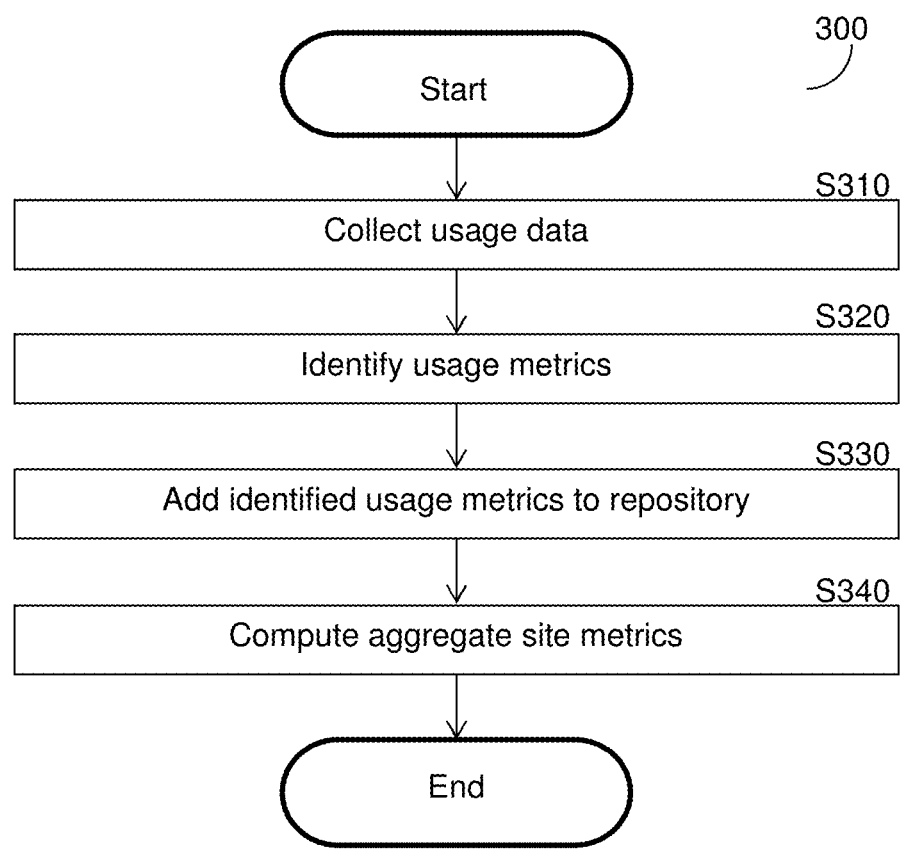
FIG. 3 is a flowchart depicting a method for computing aggregate site metrics from user actions, according to an embodiment.

FIG. 3 is an example flowchart 300 depicting a method for computing aggregate site metrics from user actions, according to an embodiment.

At S310, usage data is collected. Usage data refers to in-site interaction data for one or more users or website visitors. Usage data may include, as examples and without limitation, the sequence of buttons which a user clicked while browsing the website, the user's total time on the website, whether the user completed a session, other, like, data, and any combination thereof. Usage data may further refer to data, other than in-site interaction data, describing the site user or visitor's web experience, including, as examples and without limitation, the user's IP address, operating system, web browser information, other, like, information, and any combination thereof.

Usage data, as collected at S310, may be collected via various means including, without limitation, collection through a page-embedded element, collection through a browser extension, other, like, means, and any combination thereof. Usage data may be collected, at S310, through one or more page-embedded elements, included in the source code of a specific webpage by an owner, operator, administrator, or the like, hosted on one or more web servers, such as the web servers, 140, of FIG. 1, above, and configured to collect usage data for each visitor or user's webpage visit. Usage data may be further collected, at S310, through tools included in a user's web browser or application, as may be included in a user device, such as the user devices, 120, of FIG. 1, above. Tools included in a web browser or application may be configured to collect a user's usage data for each visit to a given website, and to communicate the collected usage data with one or more components of an analytic system, such as the system, 100, of FIG. 1, above.

At S320, usage metrics are identified. Usage metrics are quantifiable descriptions of website usage data and provide standardized indications of site visit behavior, administrative goal completion, and other, like, measurable factors or criteria. Usage metrics may be identified by application of one or more data filtering analyses, or other, like, analyses, to the usage data collected at S310. As an example, a usage metric may describe a user's total time engaging with a website during the user's visit. In the same example, the "total time engaged" usage metric may be identified based on analysis of the total time for which the user was connected to the website during a given visit, adjusted for inactivity by application of various filters including, without limitation, filters configured to include only those sessions having session lengths above or below various predefined thresholds, sessions having inactivity period lengths above or below certain thresholds, and the like. Further, in an embodiment, a similar usage metric may be adjusted for inactivity by application of analyses configured to identify the times during the visit at which the user engaged with one or more webpage elements, as well as the times during the visit at which the user did not engage with any webpage elements, other, like, factors, and various combinations thereof. In an embodiment, usage metrics, and the necessary analytic processes, may be pre-defined for a given webpage, a family of webpages, a time period, a subset of users matching specific criteria, other, like, factors, and any combination thereof.

At S330, identified usage metrics are added to a repository. A repository may be the database, 150, of FIG. 1, above, and the like, as well as any combination thereof. At S330, usage metrics identified at S320 are categorized within one or more repositories according to factors including, without limitation, website URL, date range, usage metric type, other, like, factors, and any combination thereof.

At S340, aggregate site metrics are computed. Aggregate site metrics refer to the combined usage metrics determined by analysis of the metrics identified hereinabove. Aggregate site metrics may include mean values, median values, other, like, aggregate measures, and any combination thereof. Aggregate site metrics may be computed based on given subsets of the available usage metric data including, without limitation, computation for given time periods, computation for records including a given keyword, other, like, selective computations, and any combination thereof.

As an example, an aggregate site metric may be an average time of user engagement, determined as the average of the values of "total time engaged" usage metrics, identified at S320 and added to a repository at S330. In an embodiment, aggregate site metrics may be computed according to various schedules including, without limitation, periodic computation, wherein aggregate metrics are recomputed, for example, weekly, based on the metrics included in the repository, continuous computation, wherein aggregate metrics are recomputed when new metric records are added to the repository, other, like, schedules, and any combination thereof.

Figure 4A:
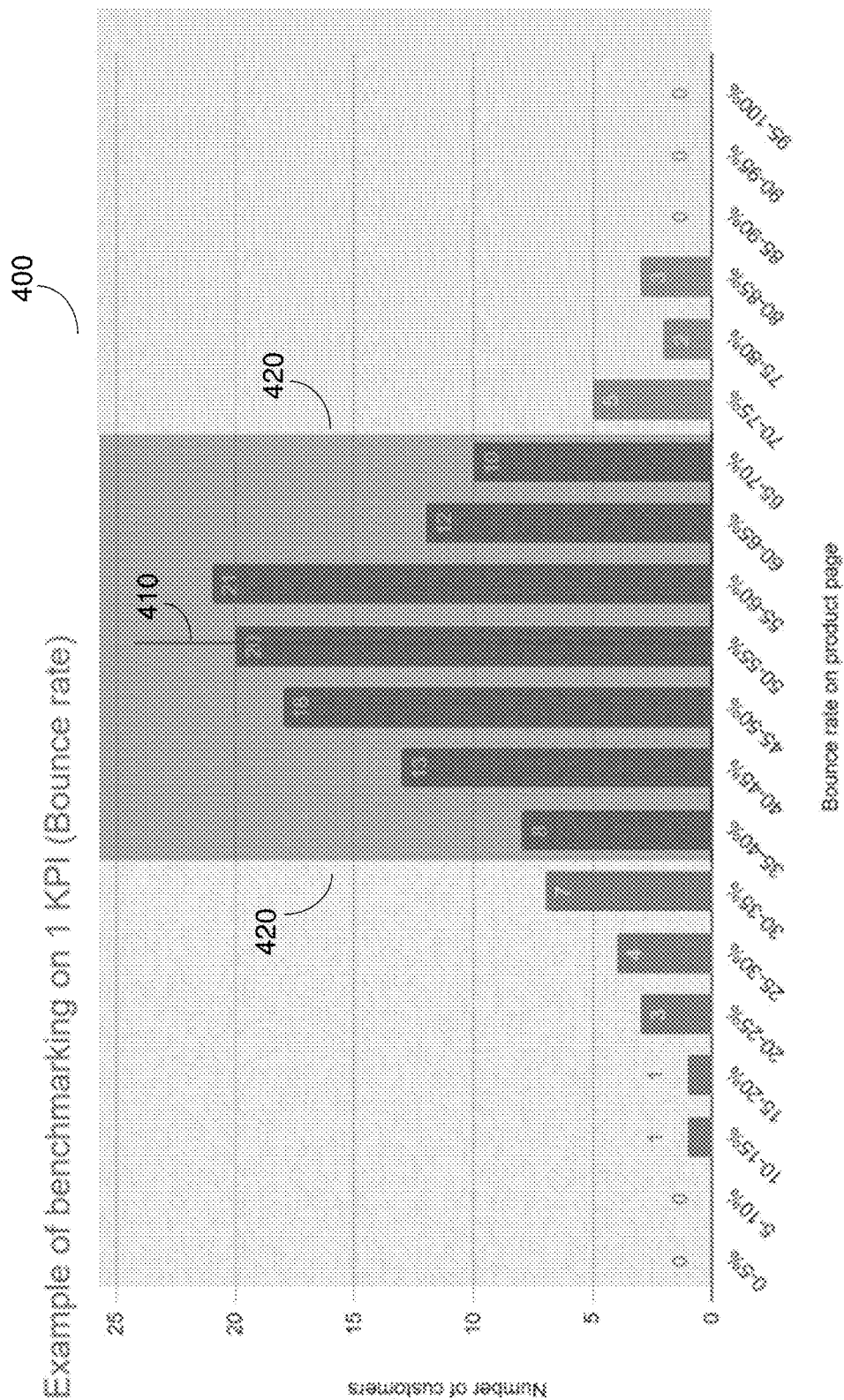
FIG. 4A is an example graph depicting benchmarking for a single key performance index (KPI), according to an embodiment.

FIG. 4A is an example graph 400 depicting benchmarking for a single key performance index (KPI), according to an embodiment. The illustration 400 includes a distribution of website bounce rate metrics for a variety of websites, against which distribution a target website's bounce rate is normalized to yield a benchmarking score, as described with respect to S230 of FIG. 2, above. The distribution included in the illustration 400 includes an indicator showing a mean value 410, centering the distribution at, in the example embodiment, a bounce rate range of fifty to fifty-five percent. Further, the distribution included in the illustration 400 includes demarcations indicating a standard deviation 420, disposed on either side of the mean, at approximately thirty-five percent and approximately seventy percent bounce rates. While the example embodiment includes a Gaussian distribution, it may be understood that other, like, distributions may be included without loss of generality or departure from the scope of the disclosure.

Figure 4B:
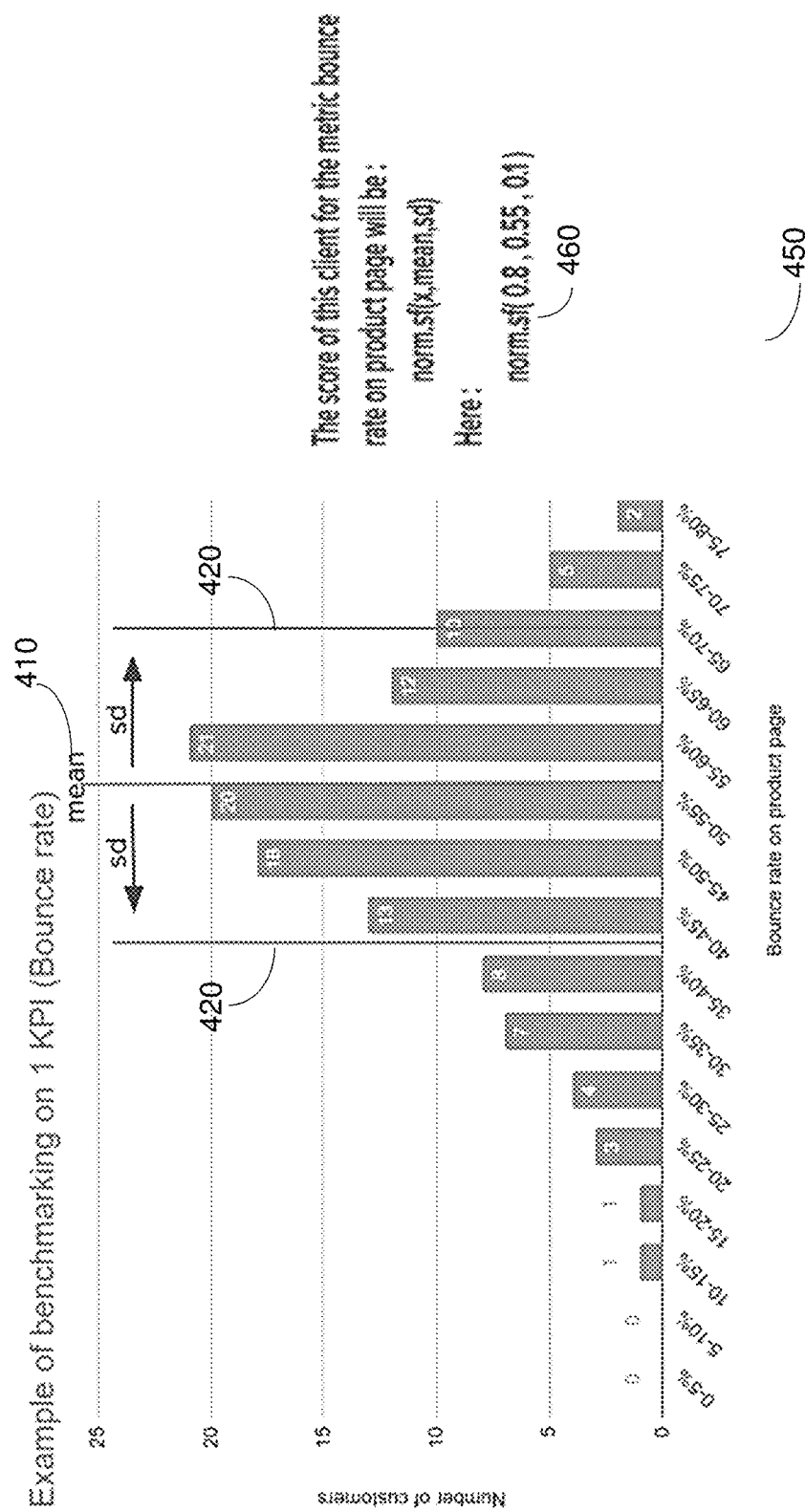
FIG. 4B is an example graph depicting benchmarking for a single KPI, according to an embodiment.

FIG. 4B is an example graph 450 depicting benchmarking for a single KPI, according to an embodiment. The distribution included in the illustration 450 describes the same statistics included in FIG. 4a and includes indicators for the mean 410 and the standard deviation 420. The illustration 450 further provides an example analysis 460 for determination of a bounce rate benchmarking score, as described with respect to S230 of FIG. 2, above.

Figure 5:
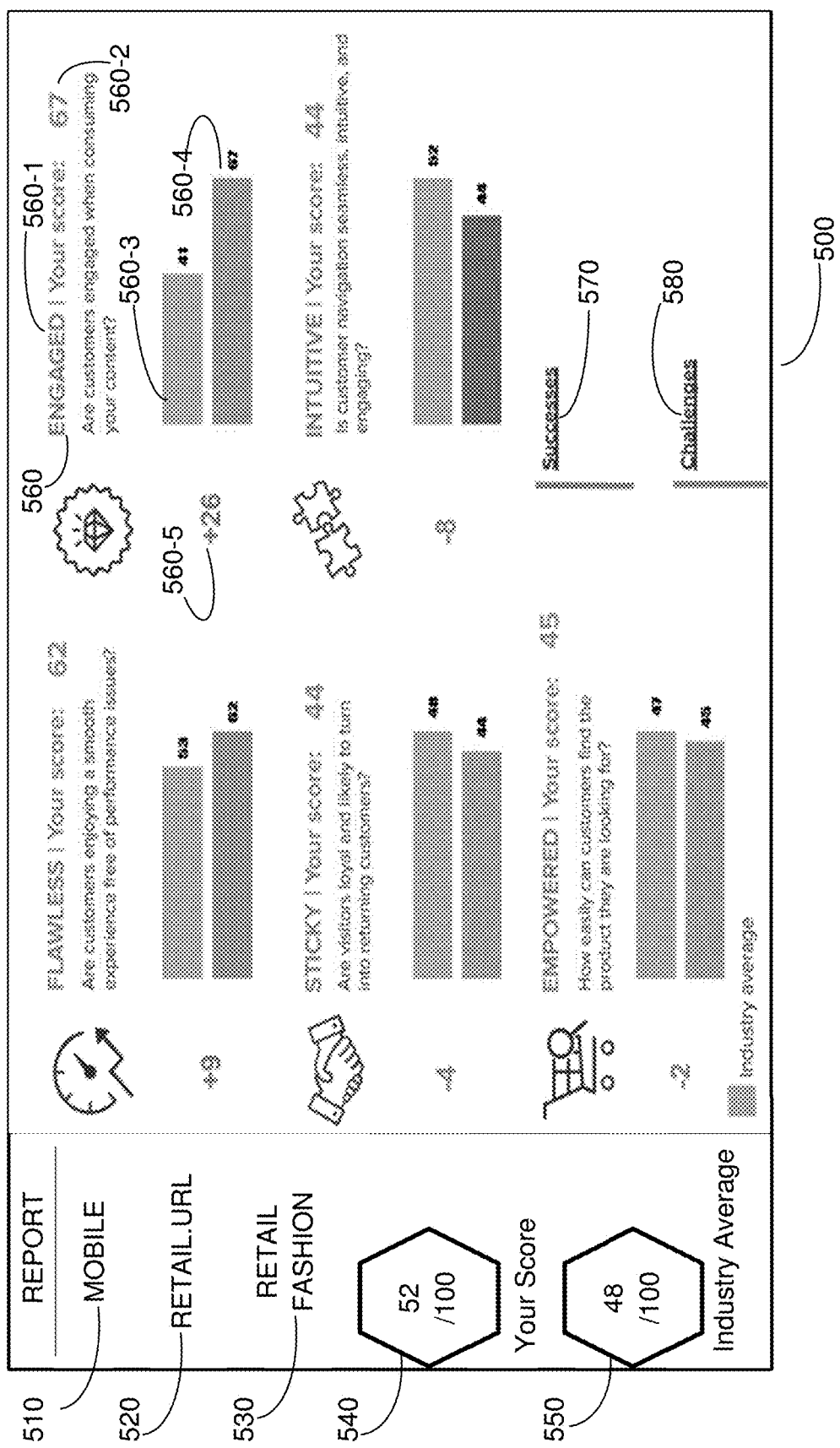
FIG. 5 is an illustration depicting a satisfaction score report, according to an embodiment.

FIG. 5 is an illustration 500 depicting a satisfaction score report, according to an embodiment. In the satisfaction score report included in the illustration 500, a first panel includes identifying information, such as data describing the website mode 510, the website uniform resource locator (URL) 520, the website's industry category 530, the website's satisfaction score 540, and the industry average satisfaction score 550. Further, in a second panel, the satisfaction score report included in the illustration includes data describing each pillar contributing to the site's satisfaction score. A first pillar 560 is identified, and relevant data is included for user review. Data related to a first pillar, included in the satisfaction score report, includes a name and description, 560-1, describing the selected pillar, including in non-technical language. The satisfaction score report further includes additional data related to the first pillar, describing the computed pillar value 560-2, determined as described with respect to S230 of FIG. 2, above, as well as graphical representations, such as bar graphs, providing for visual comparison of the industry average values 560-3 for the selected pillar and the site value 560-4 for the same pillar. Further, the satisfaction score report includes a "delta" 560-5, describing the difference between the industry average value for the given pillar and the site value for the same pillar. While a single pillar is labeled in the illustration 500 for purposes of simplicity, it may be understood that the satisfaction score report may include similar or identical data presentations for some or all pillars without loss of generality or departure from the scope of the disclosure.

Further, the satisfaction score report included in the illustration 500 includes fields for successes 570 and challenges 580. Successes and challenges may be identified at any point during the execution of the methods described hereinabove, including by manual identification, and may be included in a satisfaction score report for presentation to a user. In an embodiment, successes and challenges may be identified by a variety of means including, without limitation, human identification, automatic identification, such as by application of machine learning systems, other, like, methods, and any combination thereof. Satisfaction score reports, such as that included in the illustration 500, may be displayed, rendered, or otherwise presented through a variety of means including, without limitation, as a webpage or feature of a webpage, as may be accessible through a web browser or other application installed on a user device, such as the user devices, 120, of FIG. 1, above, where a user device may be a desktop computer, a mobile phone, a tablet computer, and the like.

Figure 6A:
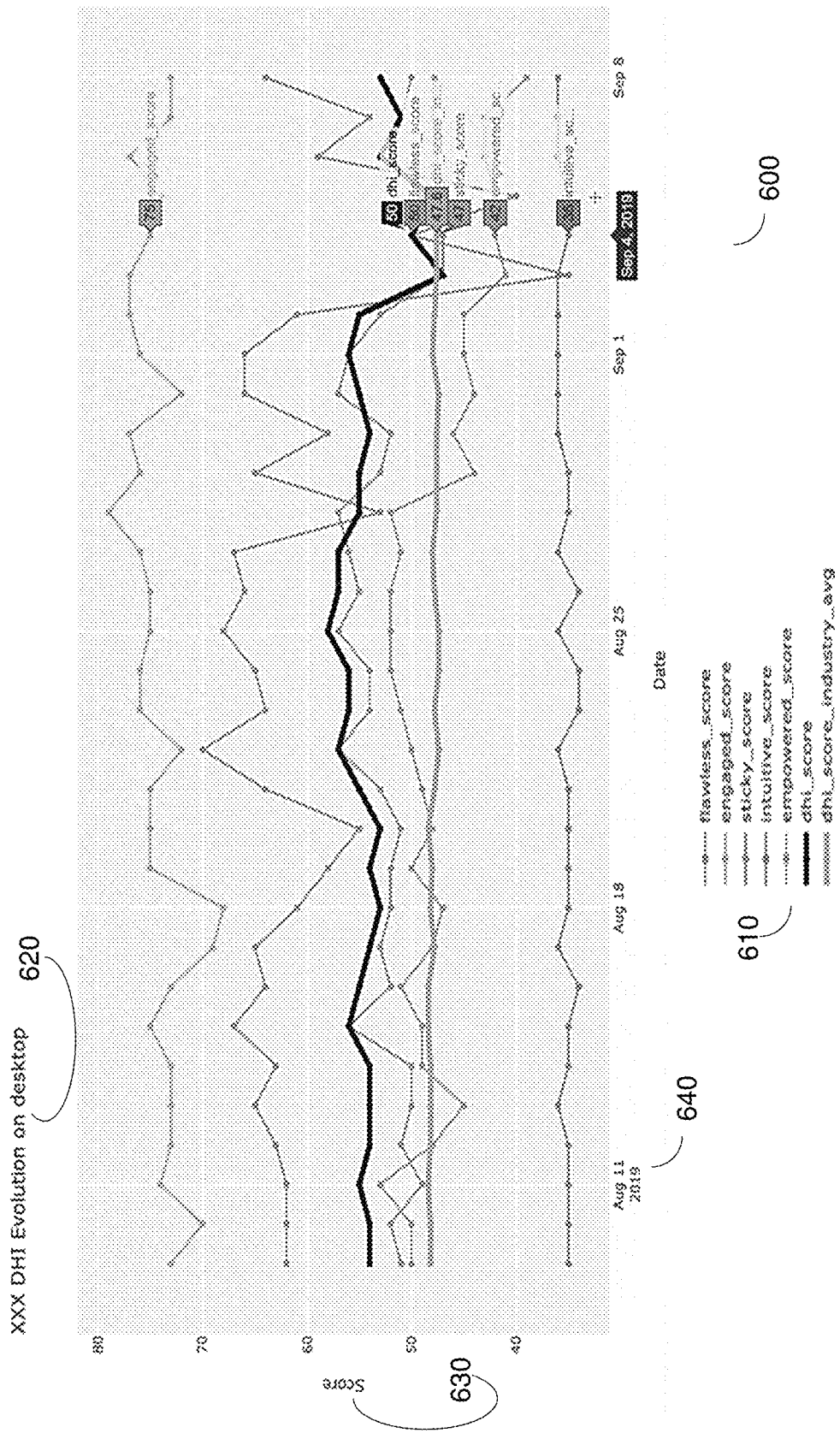
FIG. 6A is a reporting chart depicting satisfaction score evolution, according to an embodiment.

FIG. 6A is an example reporting chart 600 depicting satisfaction score evolution, according to an embodiment. The reporting chart 600 includes multiple pillar values, an overall satisfaction score, and an industry average satisfaction score. The chart 600 includes a legend 610, providing for visual identification of data associated with each of the included values and satisfaction scores. Further, the chart 600 includes a descriptor 620, providing information describing the relevant website and access platform, such as mobile access, desktop browser access, and the like. In addition, the chart 600 includes a vertical axis 630, describing the various scores of the included values and satisfaction scores, and a horizontal axis 640, describing the various dates at which the various values and satisfaction scores were recorded, allowing for visualization of the evolution of values and satisfaction scores over time. It may be understood that, while the example embodiment includes a line graph, other, like, representations may be used to provide a visual understanding of data determined according to the methods described hereinabove without loss of generality or departure from the scope of the disclosure.

Figure 6B:
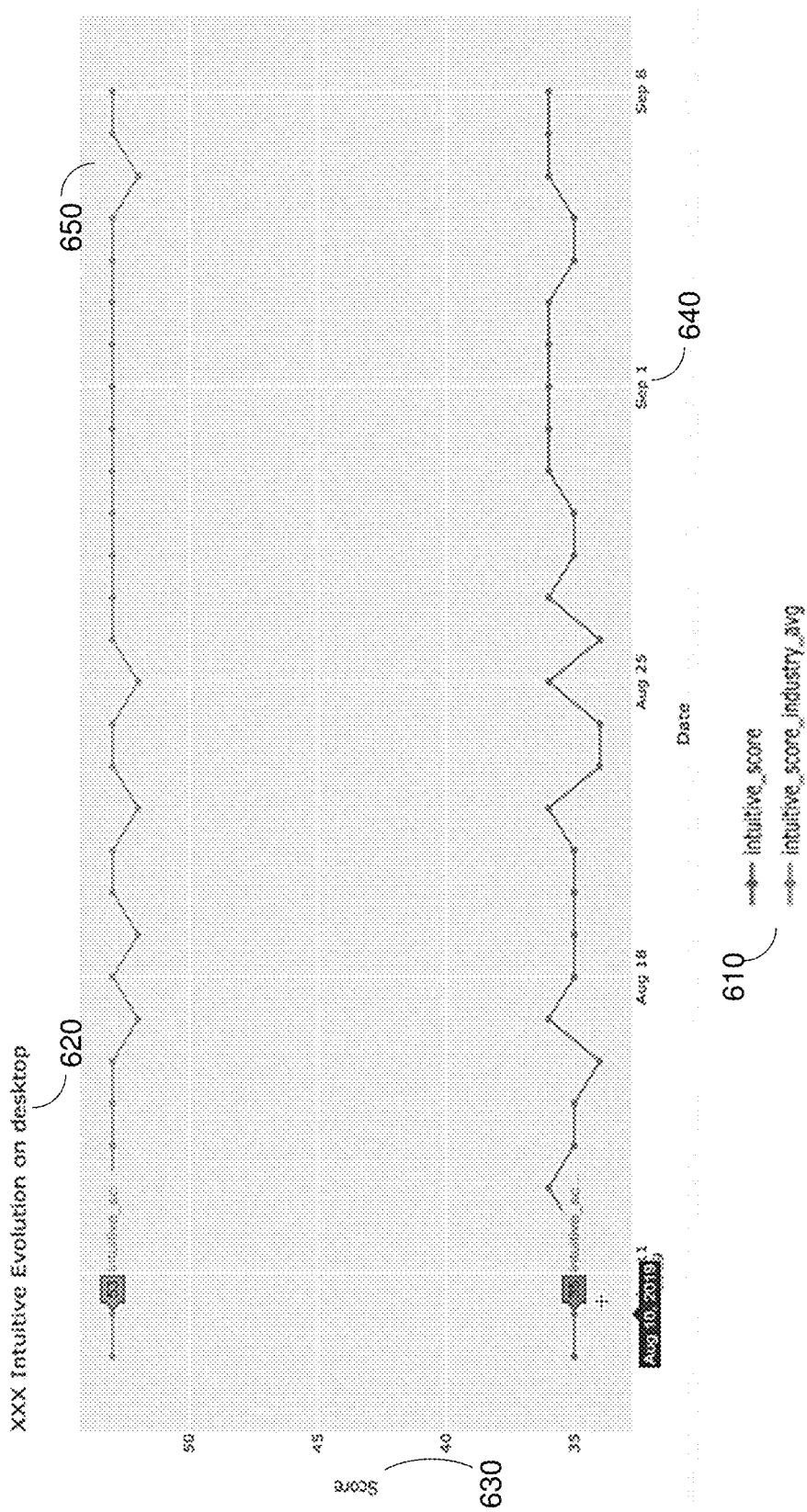
FIG. 6B is a reporting chart depicting a single-pillar satisfaction score evolution, according to an embodiment.

FIG. 6B is an example reporting chart 650 depicting a single-pillar satisfaction score evolution, according to an embodiment. The chart 650 includes aspects and elements similar or identical to the chart shown with respect to FIG. 6A, above. The chart 650 differs from that of FIG. 6a in that the chart 650 includes only data relevant to a first pillar value evolution, and the corresponding industry average pillar value evolution. It may be understood that, while the chart 650 includes a comparison of a single pillar value, graphical representations, such as the chart 650, may be employed to provide visual understandings of the various data determined according to the methods described hereinabove, without loss of generality or departure from the scope of the disclosure. In an embodiment, a reporting chart 650 may be configured to include representations of the evolution of one or more metrics, metric scores, and industry scores, providing for visualization of metric contributions to pillar scores, as described hereinabove.

Figure 7:
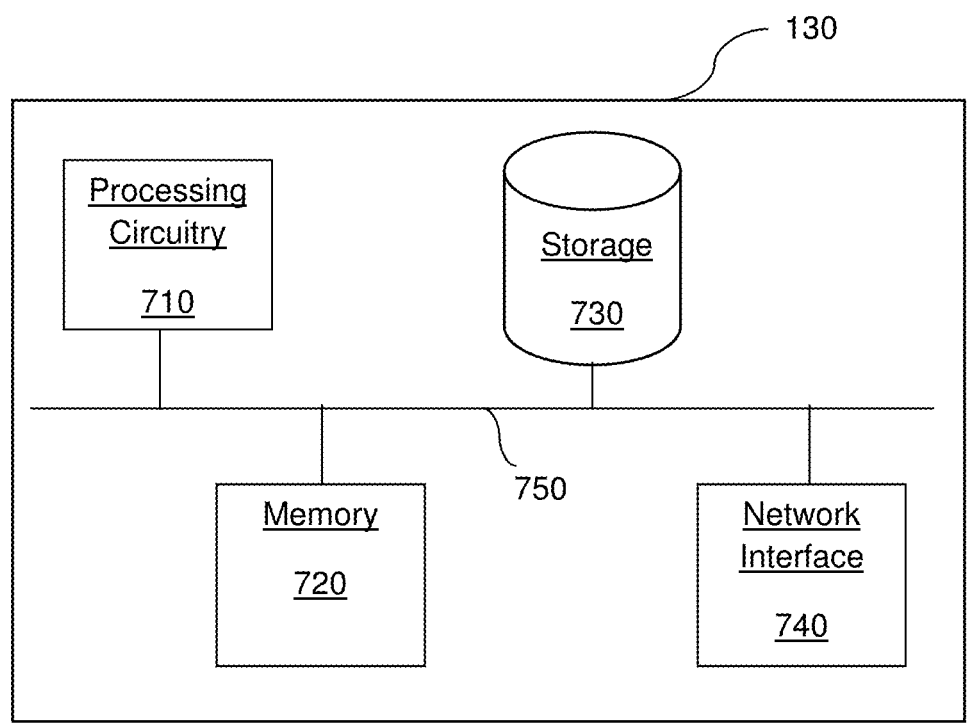
FIG. 7 is a schematic diagram of an analytic server, according to an embodiment.

FIG. 7 is an example schematic diagram of an analytic server 130, according to an embodiment. The analytic server 130 includes a processing circuitry 710 coupled to a memory 720, a storage 730, and a network interface 740. In an embodiment, the components of the server 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the analytic server 130 to communicate with the various components, devices, and systems described herein for benchmarking of user experience quality.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for benchmarking user experience quality on websites across an industry, comprising:
collecting, by an analytic server, usage data from a web server over the Internet, the web server comprising a remote web source including a first website, wherein the usage data is collected, using a tool in a web browser included in a user device, for each visit to a first website, the analytic server comprising a processing circuitry and a memory, the processing circuitry determining a set of metrics associated with the usage data collected from the web server over the Internet, the memory storing the set of metrics determined by the processing circuitry;
computing, by the processing circuitry, first site metrics for the first website, wherein a site metric is a quantitative description of user activity on a web site, the computed first site metrics being determined, by the processing circuitry, based on the usage data collected from the remote web source;
computing, by the processing circuitry, a first industry satisfaction score for the first website, wherein the first industry satisfaction score quantifies an overall level of satisfaction of users interacting with the first website, wherein the first industry satisfaction score is computed based on satisfaction score pillar values and the computed first site metrics;
wherein computing the first industry satisfaction score further comprises:
computing, by the processing circuitry, at least one satisfaction score pillar value based at least in part on a site metric from the computed first site metrics, the site metric comprising a bounce rate associated with the web site, wherein the bounce rate is based on a percentage of users that connect with the website and subsequently disconnect with the website without further interaction;

comparing, by the processing circuitry, the first industry satisfaction score computed for the first website to a second industry satisfaction score previously computed for a second website, wherein the first website and the second website are from the same industry, the comparing identifying at least one site performance issue in the first website or the second website that facilitates improvement of performance in the first website or the second website;

providing, by the processing circuitry, for display comparison results of the comparing over the Internet on a display of a user device, wherein a satisfaction score pillar describes user experience with the first website with respect to at least one attribute, wherein the at least one attribute includes at least one of a flawless pillar value, an engaged pillar value, a sticky pillar value, an intuitive pillar value, or an empowered pillar value; and determining, by the processing circuitry, an average satisfaction score pillar value based on a set of satisfaction score pillar values for the first website, wherein determining the average satisfaction score pillar value comprises:

determining, by the processing circuitry, a first value of the flawless pillar value for the first website;

determining, by the processing circuitry, a second value of the engaged pillar value for the first website;

determining, by the processing circuitry, a third value of the sticky pillar value for the first website;

determining, by the processing circuitry, a fourth value of the intuitive pillar value for the first website;

determining, by the processing circuitry, a fifth value of the empowered pillar value for the first website; and calculating, by the processing circuitry, the average satisfaction score pillar value based on the first value, the second value, the third value, the fourth value, and the fifth value.

2. The method of claim 1, wherein computing the site metrics further comprises:

collecting site usage data, wherein site usage data includes in-site interaction of a plurality of visitors with the first website;

identifying, in the site usage data, usage metrics, wherein the usage metrics are quantifiable descriptions of usage data of the first website; and computing aggregated site metrics as a statistical value of the identified usage metrics.

3. The method of claim 2, wherein the usage metrics further provide standardized indications of any one of: a visit behavior and an administrative goal completion.

4. The method of claim 1, further comprising:

computing a satisfaction score pillar value based on at least one predefined pillar.

5. The method of claim 4, further comprising:

assigning a weight for each of the least one pillar; and computing the first industry satisfaction score based on the weighted at least one pillar.

6. The method of claim 1, further comprising:

computing second site metrics for the second website;

computing the second industry satisfaction score for the second website; and storing the second site metrics and the second site industry satisfaction score.

7. The method of claim 1, wherein reporting the comparison results further comprises:

returning the first and second industry satisfaction scores.

8. A non-transitory computer readable medium having stored thereon instructions for instructions for causing a processing circuitry to execute a process, the process comprising:

collecting, by an analytic server, usage data from a web server over the Internet, the web server comprising a remote web source including a first website, wherein the usage data is collected, using a tool in a web browser included in a user device, for each visit to a first website, the analytic server comprising the processing circuitry and a memory, the processing circuitry determining a set of metrics associated with the usage data collected from the web server over the Internet, the memory storing the set of metrics determined by the processing circuitry;

computing, by the processing circuitry, first site metrics for the first website, wherein a site metric is a quantitative description of user activity on a web site, the computed first site metrics being determined, by the processing circuitry, based on the usage data collected from the remote web source;

computing, by the processing circuitry, a first industry satisfaction score for the first website, wherein the first industry satisfaction score quantifies an overall level of satisfaction of users interacting with the first website, wherein the first industry satisfaction score is computed based on satisfaction score pillar values and the computed first site metrics, identifying usage metrics within collected usage, wherein computing the first industry satisfaction score further comprises:

computing, by the processing circuitry, at least one satisfaction score pillar value based at least in part on a site metric from the computed first site metrics, the site metric comprising a bounce rate associated with the web site, wherein the bounce rate is based on a percentage of users that connect with the website and subsequently disconnect with the website without further interaction;

comparing, by the processing circuitry, the first industry satisfaction score computed for the first website to a second industry satisfaction score previously computed for a second website, wherein the first website and the second website are from the same industry, the comparing identifying at least one site performance issue in the first website or the second website that facilitates improvement of performance in the first website or the second website;

providing, by the processing circuitry, for display comparison results of the comparing over the Internet on a display of a user device, wherein a satisfaction score pillar describes user experience with the first website with respect to at least one attribute, wherein the at least one attribute includes at least one of a flawless pillar value, an engaged pillar value, a sticky pillar value, an intuitive pillar value, or an empowered pillar value; and determining, by the processing circuitry, an average satisfaction score pillar value based on a set of satisfaction score pillar values for the first website, wherein determining the average satisfaction score pillar value comprises:

determining, by the processing circuitry, a first value of the flawless pillar value for the first website;

determining, by the processing circuitry, a second value of the engaged pillar value for the first website;

determining, by the processing circuitry, a third value of the sticky pillar value for the first website;

determining, by the processing circuitry, a fourth value of the intuitive pillar value for the first website;

determining, by the processing circuitry, a fifth value of the empowered pillar value for the first website; and calculating, by the processing circuitry, the average satisfaction score pillar value based on the first value, the second value, the third value, the fourth value, and the fifth value.

9. A system for benchmarking user experience quality on websites across an industry, comprising:

a processing circuitry; and a memory, the memory containing instructions that, when executed by the processing circuitry, cause the processing circuitry to perform operation comprising:

collecting, by an analytic server, usage data from a web server over the Internet, the web server comprising a remote web source including a first website, wherein the usage data is collected, using a tool in a web browser included in a user device, for each visit to a first website, the analytic server comprising a processing circuitry and a memory, the processing circuitry determining a set of metrics associated with the usage data collected from the web server over the Internet, the memory storing the set of metrics determined by the processing circuitry;

computing, by the processing circuitry, first site metrics for the first website, wherein a site metric is a quantitative description of user activity on a web site;

computing, by processing circuitry, a first industry satisfaction score for the first website, wherein the first industry satisfaction score quantifies an overall level of satisfaction of users interacting with the first website, wherein the first industry satisfaction score is computed based on satisfaction score pillar values and the computed first site metrics, identifying usage metrics within collected usage, wherein computing the first industry satisfaction score further comprises:

computing, by processing circuitry, at least one satisfaction score pillar value based at least in part on a site metric from the computed first site metrics, the site metric comprising a bounce rate associated with the web site, wherein the bounce rate is based on a percentage of users that connect with the website and subsequently disconnect with the website without further interaction;

comparing, by processing circuitry, the first industry satisfaction score computed for the first website to a second industry satisfaction score previously computed for a second website, wherein the first website and the second website are from the same industry, the comparing identifying at least one site performance issue in the first website or the second website that facilitates improvement of performance in the first website or the second website;

providing, by processing circuitry, for display results of the comparing over the Internet on a display of a user device, wherein a satisfaction score pillar describes user experience with the first website with respect to at least one attribute, wherein the at least one attribute includes at least one of a flawless pillar value, an engaged pillar value, a sticky pillar value, an intuitive pillar value, or an empowered pillar value; and determining, by processing circuitry, an average satisfaction score pillar value based on a set of satisfaction score pillar values for the first website, wherein determining the average satisfaction score pillar value comprises:

determining, by processing circuitry, a first value of the flawless pillar value for the first website;

determining, by processing circuitry, a second value of the engaged pillar value for the first website;

determining, by processing circuitry, a third value of the sticky pillar value for the first website;

determining, by processing circuitry, a fourth value of the intuitive pillar value for the first website;

determining, by processing circuitry, a fifth value of the empowered pillar value for the first website; and calculating, by processing circuitry, the average satisfaction score pillar value based on the first value, the second value, the third value, the fourth value, and the fifth value.

10. The system of claim 9, wherein the operations further comprise:

collecting site usage data, wherein site usage data includes in-site interaction of a plurality of visitors with the first website;

identifying, in the site usage data, usage metrics, wherein the usage metrics are quantifiable descriptions of usage data of the first website; and computing aggregated site metrics as a statistical value of the identified usage metrics.

11. The system of claim 10, wherein the usage metrics further provide standardized indications of any one of: a visit behavior and an administrative goal completion.

12. The system of claim 9, wherein the operations further comprise:

computing a satisfaction score pillar value based on at least one predefined pillar.

13. The system of claim 12, wherein the operations further comprise:

assigning a weight for each of the least one pillar; and computing the first industry satisfaction score based on the weighted at least one pillar.

14. The system of claim 9, wherein the operations further comprise:

computing second site metrics for the second website;

computing the second industry satisfaction score for the second website; and storing the second site metrics and the second site industry satisfaction score.

15. The system of claim 9, wherein the operations further comprise:

returning the first and second industry satisfaction scores.

16. The method of claim 1, wherein the first value, the second value, the third value, the fourth value, and the fifth value are different values.

17. The method of claim 1, wherein the set of usage metrics comprises a total time engaged usage metric that is determined, by the processing circuitry, by filtering a set of sessions having a session length below a predefined threshold.

* * * * *

UNITED STATES PATENT AND TRADEMARK OFFICE
CERTIFICATE OF CORRECTION

| | | |
|---|---|---|
| PATENT NO. | : 12,051,023 B2 | Page 1 of 1 |
| APPLICATION NO. | : 16/937950 | |
| DATED | : July 30, 2024 | |
| INVENTOR(S) | : Flacher et al. | |

It is certified that error appears in the above-identified patent and that said Letters Patent is hereby corrected as shown below:

On the Title Page

In item (57), in "Abstract", in Column 2, Lines 4-5, delete "web site;" and insert --website;-- therefor In the Claims In Column 12, Line 53, in Claim 1, delete "web site," and insert --website,-- therefor In Column 13, Line 3, in Claim 1, delete "web site," and insert --website,-- therefor In Column 13, Line 55, in Claim 3, after "of:", insert a linebreak In Column 14, Line 23, in Claim 8, delete "web site," and insert --website,-- therefor In Column 14, Line 40, in Claim 8, delete "web site," and insert --website,-- therefor In Column 15, Line 32, in Claim 9, delete "web site;" and insert --website;-- therefor In Column 15, Line 46, in Claim 9, delete "web site," and insert --website,-- therefor In Column 16, Line 34, in Claim 11, after "of:", insert a linebreak Signed and Sealed this
Twenty-ninth Day of April, 2025

Coke Morgan Stewart
*Acting Director of the United States Patent and Trademark Office*